United States Patent
Alvarez

(10) Patent No.: US 9,221,082 B2
(45) Date of Patent: Dec. 29, 2015

(54) METHOD FOR HIGH-PRESSURE LIQUID JET DEBURRING AND CORRESPONDING INDUSTRIAL INSTALLATION

(75) Inventor: Antonio Alvarez, Stolberg (DE)

(73) Assignee: Elwema Automotive GmbH, Ellwangen (DE)

( * ) Notice: Subject to any disclaimer, the term of this patent is extended or adjusted under 35 U.S.C. 154(b) by 586 days.

(21) Appl. No.: 13/522,420

(22) PCT Filed: Jan. 17, 2011

(86) PCT No.: PCT/EP2011/050548
§ 371 (c)(1),
(2), (4) Date: Sep. 18, 2012

(87) PCT Pub. No.: WO2011/086185
PCT Pub. Date: Jul. 21, 2011

(65) Prior Publication Data
US 2013/0000683 A1    Jan. 3, 2013

(30) Foreign Application Priority Data
Jan. 15, 2010 (EP) .................................... 10150834

(51) Int. Cl.
*B08B 3/02* (2006.01)
*B08B 15/02* (2006.01)
(Continued)

(52) U.S. Cl.
CPC ... *B08B 3/02* (2013.01); *B08B 7/04* (2013.01); *B08B 15/02* (2013.01); *B23D 19/02* (2013.01); *C23G 3/00* (2013.01)

(58) Field of Classification Search
CPC ............ B08B 3/02; B08B 7/04; B08B 15/02; B23D 79/02; C23G 3/00
USPC ............ 134/26, 34, 36, 95.1, 95.2, 95.3, 135, 134/137
See application file for complete search history.

(56) References Cited

U.S. PATENT DOCUMENTS 5,485,861 A * 1/1996 Hiratsuka et al. ............. 134/182
8,608,865 B2 * 12/2013 Karls .............................. 134/36
(Continued)

FOREIGN PATENT DOCUMENTS

CN            101107084 A       1/2008
DE       10-2008 015042    *    9/2009
(Continued)

OTHER PUBLICATIONS
Int'l Search Report and Written Opinion issued Mar. 11, 2011 in Int'l Application No. PCT/EP2011/050548.
(Continued)

*Primary Examiner* — Saeed T Chaudhry
(74) *Attorney, Agent, or Firm* — Panitch Schwarze Belisario & Nadel LLP

(57) ABSTRACT

A method and an installation for high-pressure liquid jet deburring are proposed, in which a machined workpiece (44) is deburred by means of a high-pressure/high-speed liquid jet from a high-pressure jet nozzle (30) that is connected to a high-pressure liquid circuit (32). According to the invention, the deburring receptacle (16) has a flooding inlet (48) connected to a liquid supply circuit for flooding the deburring receptacle (16) with cleaning liquid and is configured to contain a bath (46) of cleaning liquid during operation. Prior to deburring, the deburring receptacle (16) is flooded with cleaning liquid via a flooding inlet (48) of the deburring receptacle. Further according to the invention, the machined portion (44) is deburred after flooding and by means of a liquid jet without gas sheath such that the high-pressure/high-speed liquid jet and at least the machined portion are immersed in a bath of cleaning liquid during deburring.

20 Claims, 6 Drawing Sheets

(51) Int. Cl.
*C23G 3/00* (2006.01)
*B23D 19/02* (2006.01)
*B08B 7/04* (2006.01)

(56) References Cited

U.S. PATENT DOCUMENTS

| 2008/0006306 A1 | 1/2008 | Leyendecker et al. |
| 2011/0056525 A1 | 3/2011 | Karls |

FOREIGN PATENT DOCUMENTS

| DE | 102008015042 A1 | | 9/2009 |
| EP | 0669187 A2 | | 8/1995 |
| EP | 0829311 A2 | | 3/1998 |
| JP | H08-10722 A | | 1/1996 |
| JP | 2006-052423 A | | 2/2006 |
| JP | 2006052423 | * | 2/2006 |
| JP | 2007-113072 A | | 5/2007 |

OTHER PUBLICATIONS

Int'l Preliminary Report on Patentability issued Jul. 26, 2012 in Int'l Application No. PCT/EP2011/050548.
Office Action issued Nov. 6, 2012 in EP Application No. 11 700 196.6.
Office Action issued Nov. 18, 2013 in RU Application No. 2012133278/05.
English translation of an Office Action issued Dec. 27, 2013 in CN Application No. 201180013469.3.
Notice of Opposition issued Aug. 28, 2014 in EP Application No. 11700196.6.
Electronic Publication of "Cleaning System," published anonymously to http://www.ip.com (Oct. 17, 2008).
Communication dated May 11, 2015 in Opposition in EP Patent No. 2 523 761.

* cited by examiner

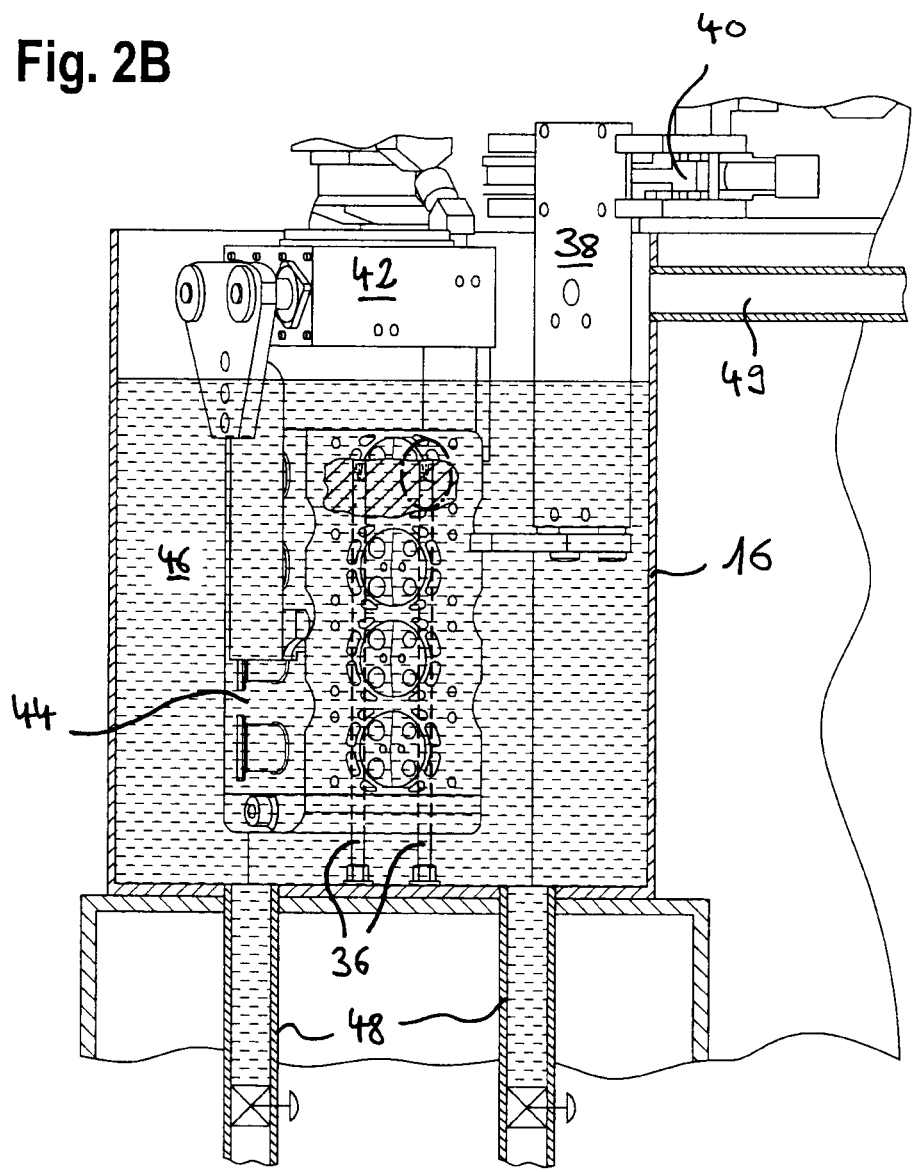

METHOD FOR HIGH-PRESSURE LIQUID JET DEBURRING AND CORRESPONDING INDUSTRIAL INSTALLATION

CROSS-REFERENCE TO RELATED APPLICATION

This application is a Section 371 of International Application No. PCT/EP2011/050548, filed Jan. 17, 2011, which was published in the English language on Jul. 21, 2011, under International Publication No. WO 2011/086185 A1, and the disclosure of which is incorporated herein by reference.

TECHNICAL FIELD

The present invention generally relates to the field of industrial cleaning of machined workpieces, and more particularly to a method and an industrial installation for deburring machined workpieces, especially metal workpieces such as engine and gearbox components, by means of a high-pressure liquid jet.

Burrs are unwanted remainders of material, e.g. in the form of a thin ridge or an area of roughness, that remain attached to a workpiece after a machining operation, i.e. a working operation involving removal of material by cutting, such as drilling, milling, grinding or turning. Drilling burrs, for instance, commonly occur when drilling almost any type of material, but especially when drilling metal. Removal of such burrs is called deburring in the present context.

One specific example of unwanted burrs is in the automotive industry, more specifically in engine and gearbox manufacture, where cylinder blocks, cylinder heads, gearbox parts and other cast components are machined to specific dimensions. With increasingly stringent requirements placed on accuracy and precision, reliable burr removal is of critical importance because it can affect engine or gearbox performance, reliability, and durability. While not being limited to the latter application, the present invention is especially suitable for deburring engine or gearbox components.

BACKGROUND ART

High-pressure liquid jet deburring has found widespread acceptance for deburring workpieces with complex geometries or inside contours. This is among others because the non-touching treatment with a liquid jet, e.g. a water jet, eliminates the need for costly guiding units capable of adapting to the workpiece complexity (e.g. in a CNC-machining centre for classical burr removal by means of rotary machining tools).

International patent application WO2006/077037, for example, discloses an automated industrial cleaning plant, including a pre-washing station, a high-pressure liquid jet deburring station, an injection flood washing station and a vacuum cleaning station. In the high-pressure liquid jet deburring station according to WO2006/077037, a machined workpiece is positioned in an open space by means of an industrial robot. Subsequently, a machined workpiece, from which burr is to be removed, is subjected to high-pressure/high-speed liquid jet (e.g. at 1000 bar) for deburring said workpiece by the cutting action of the liquid jet.

German patent application DE 10 2006 039 035 discloses a modified method and installation for high-pressure jet deburring, in particular for engine components, and aims at reducing deposition or accumulation of small pieces of material detached during burring (shavings, swarf, scobs, chips). According to DE 10 2006 039 035 a machined workpiece from which burr is to be removed is positioned inside a deburring receptacle by means of a positioning device and deburred by means of a high-pressure jet nozzle that creates a high-pressure/high-speed jet for detaching burr. The deburring receptacle according to DE 10 2006 039 035 has a pulverization nozzle connected to a liquid supply circuit for creating a mist of sprayed droplets (aerosol) inside the receptacle. Creating a gaseous hull containing droplets around the workpiece during deburring is meant to slow down, bind and carry off particles detached during deburring, thereby increasing cleanliness by reducing the amount of residues on the workpiece. Whereas DE 10 2006 039 035 appears to improve final workpiece cleanliness compared to known deburring methods (as disclosed in WO2006/077037), it does not address the problem of increasing the efficiency or effectiveness of deburring, i.e. material cutting.

German patent application DE 10 2005 013 948 discloses a further modified method and installation for high-pressure liquid jet deburring, in particular for engine components, that does address the problem of increasing the deburring efficiency compared to known deburring methods (as disclosed e.g. in WO2006/077037). As a corollary, DE 10 2005 013 948 enables reducing the supply pressure required for a given deburring effectiveness and thereby reducing the energy consumption of the high-pressure pumps (which, in known industrial installations can attain up to 500 kW). To this end, DE 10 2005 013 948 proposes configuring the deburring receptacle as a vacuum chamber and creating a vacuum (negative pressure) inside the chamber during deburring. Reducing the air density inside the deburring chamber minimizes the loss of kinetic energy of the high-pressure/high-speed liquid jet on its trajectory prior to impacting the zone of burr. According to DE 10 2005 013 948, improved deburring efficiency at equal supply pressure (better result), or equal deburring efficiency at reduced supply pressure (energy savings) can be achieved using sub-atmospheric pressure inside the deburring receptacle.

German patent application DE 10 2008 015 042 and equivalent WO 2009/112485 disclose a slightly different approach of high-pressure liquid jet deburring. They propose moving a workpiece into a receptacle that contains a cleaning liquid so that at least that workpiece portion from which burr is to be removed is dipped in cleaning liquid. A special deburring nozzle is also moved into the deburring receptacle. The machined portion is then deburred by means of a high-pressure liquid jet while at least the relevant machined portion is dipped in liquid. In order to reduce resistance of surrounding liquid, DE 10 2008 015 042 adopts the conventional approach of underwater jet cleaning (jetting). In fact, underwater jetting, e.g. for cleaning a boat hull, is carried out by means of gas-sheathed pressurized water jets. Examples of underwater jetting are described e.g. in patent documents JP 60 029394, JP 6 047670 and WO 02/44020. Accordingly, even though suggesting unconventional "underwater" deburring, DE 10 2008 015 042 provides a gas sheath that surrounds the high-pressure liquid jet with the very same aim as above discussed DE 10 2005 013 948, namely that of minimizing loss of kinetic energy of the jet.

Technical Problem

In view of the prior art, it is an object of the present invention to provide an alternative method and installation enabling simplified and yet effective high-pressure liquid jet deburring.

GENERAL DESCRIPTION OF THE INVENTION

In order to overcome the above-mentioned problem, the present invention proposes a method according to claim 1 and a corresponding installation according to claim 11.

The method concerns high-pressure liquid jet deburring of a workpiece, such as a cylinder block, a cylinder head, a gearbox part or any other internal combustion engine component, especially when cast, that has at least one machined portion from which burr is to be removed. As proposed in claim 1 the method comprises the steps of:

- positioning the machined workpiece inside a deburring receptacle by means of a positioning device, e.g. by means of an industrial 6 degree-of-freedom robot; and
- deburring the machined portion by means of a high-pressure and high-speed liquid jet, preferably a pure liquid jet devoid of abrasive particles (e.g. pure water jet deburring/hydro deburring, not abrasive water jetting AWJ), the jet being created using a high-pressure jet nozzle and at least the machined portion that is to be deburred being dipped in a liquid such as a washing liquid.

According to the present invention, the method further comprises the steps of:

- flooding the deburring receptacle with cleaning liquid, prior to or after positioning the workpiece, via a flooding inlet of the deburring receptacle so as to create a bath of cleaning liquid inside the receptacle; and
- deburring the machined portion after flooding such that the high-pressure and high-speed liquid jet and at least the machined portion to be deburred are, during deburring, immersed in the bath of cleaning liquid contained by the receptacle, that is to say without sheathing gas envelope (gas sheath) partially or fully around the high-pressure and high-speed liquid jet.

A corresponding installation for carrying out the above method is proposed in claim 10.

Surprisingly and in stark contrast to the seemingly sensible approach of reducing the drag to which the high-pressure/high-speed liquid jet is subjected (see e.g. "vacuum spraying" in DE 10 2005 013 948 or gas-sheathed "underwater jetting" in DE 10 2008 015 042), it has been found that the effectiveness of high-pressure liquid jet deburring is not significantly affected or may even be increased when jet deburring in immersion, that is to say, when the jet as well as the region to be deburred are submerged in liquid. Without wanting to be bound by theory, this effect is believed to be attributable to the static pressure exerted onto the burr(s) by the surrounding liquid acting in the manner of a pressure pad or a holder-up to improving the "cutting" efficiency of the deburring jet in the special operation of deburring. As will be understood, the expression "immersed" is used in its ordinary meaning in the present context. In other words and in contrast to commonly adopted practice in underwater jetting, the liquid jet—as it exits the nozzle—is immediately plunged or submerged in surrounding liquid, preferably in washing liquid of the bath. Most preferably, there is no sheathing at all. In any case no gas sheathing of the jet is provided. As beneficial side-effects, excessive wear due to cavitation is reduced if not eliminated, a greater jet aperture angle is enabled, construction is simplified and energy consumption reduced.

In this context, it will be noted that submerging machined workpieces for cleaning purposes in industrial cleaning processes, e.g. of engine or gearbox components, is well known e.g. in flood washing processes. In flood washing the workpiece is flooded with cleaning liquid and strong currents and turbulences are created within the liquid, e.g. by means of air or water jets at comparatively low pressure (see e.g. U.S. Pat. No. 5,419,352 or WO 2008/022701). Due to currents and turbulences, the liquid washes over, around and inside the workpiece and thereby allows extracting loose residues (e.g. shavings, swarf, scobs, chips) from cavities and recesses in the workpiece. In addition, when adding adequate detergents to the cleaning liquid, flood washing aims at saponification and emulsification in order to wash away other contaminants e.g. oily residues such as cutting oil.

The present invention in turn, has the incontestable merit of proposing for the first time high-pressure liquid jet deburring of a workpiece in immersion, so to speak liquid-immersed deburring by liquid jet. As will be appreciated, deburring as such is a fundamentally different operation from merely extracting already detached i.e. loose particles by turbulent washing. A high-pressure/high-speed liquid jet for deburring is generally suitable for cutting metal portions of thin wall strength, e.g. non-detached aluminum or steel burrs, and to this end, the nozzle exit pressure of the high-pressure/high-speed liquid jet at the nozzle outlet is generally significantly greater than 100 bar, more preferably greater than 500 bar.

Preferably, the high-pressure jet nozzle has a shaped outlet, in particular an elongated outlet with double curvature, e.g. around two orthogonal axes, and creates a high-pressure/high-speed liquid jet with a jet aperture angle of at least 45°, preferably in the range of 45° to 90°. The expression jet aperture angle herein refers to the apex or aperture angle of the smallest cone that envelops the jet.

In a preferred embodiment that facilitates construction and operation, the high-pressure jet nozzle is mounted stationary inside the deburring receptacle. Accordingly, the machined portion, especially a machined cavity, is located within the range of action of the stationary high-pressure jet nozzle by simply positioning the workpiece relative to the fixed nozzle e.g. using a conventional industrial robot for positioning and holding the workpiece, especially for inserting the stationary nozzle inside a machined cavity of the workpiece.

Preferably, the machined workpiece is subjected to a flood washing process inside the deburring receptacle at least during the deburring step, more preferably also prior to starting and after completing the liquid jet deburring step. Flood washing can be achieved by creating turbulence in the immersion bath, e.g. by means of a pump for creating strong recirculation turbulences or injecting liquid jets into the bath in order to flood wash the workpiece. Taking advantage of the presence of a bath, supplementary flood washing further reduces deposition or accumulation of detached burr, e.g. in internal cavities of the workpiece. In order to extract and remove burr particles and other residues, the method preferably comprises continuously re-circulating the cleaning liquid of the bath through a particle filter arranged in a recirculation circuit to further improve workpiece cleanness.

In a further preferred embodiment, using an industrial 6-degree-of-freedom robot as positioning device, a cleaning plant implementing the method according to the invention comprises a pre-washing receptacle, the deburring receptacle as set out above, optionally one or more further deburring receptacles, preferably as set out above and a drying receptacle. Advantageously, each of the receptacles is arranged within the reachable workspace of the robot, whereby a single robot can be used to cycle a given workpiece sequentially through the different treatment stations (pre-washing, deburring and/or flood washing, drying). This embodiment preferably comprises a single pressurization source for providing high-pressure liquid, e.g. a high-pressure pump, that is connected, by means of a suitable valve arrangement connected to a suitable control, in serial succession i.e. sequentially to the pre-washing receptacle, to the deburring receptacle and, if applicable, consecutively to the one or more further deburring receptacles. In a particularly ergonomic arrangement, the industrial robot has a mounting base arranged above the horizontal level of the uppermost of the upper openings in the receptacles through which the robot inserts the workpiece vertically.

In a preferred mode of execution, the high-pressure jet nozzle is provided on or formed integrally with an elongated stationary lance projecting into the deburring receptacle, e.g. vertically. In this embodiment, the method further comprises, after a possible turning back, holding the stationary lance in position by means of a removable clamp when the lance is not in use. The removable clamp is released after pre-positioning the workpiece and subsequently the workpiece is then positioned so that the machined portion is located within the range of action of the stationary high-pressure jet nozzle. The latter approach allows avoiding undefined motion of the lance and integrating collision detection more reliably into the robot motion control program.

As set out hereinabove, the proposed method and installation are not exclusively but particularly suitable for industrial application in the field of automotive engine and gearbox manufacture.

The invention also relates to a method and installation as proposed in claims 17 and 18, and any combination thereof with one or more of the preceding preferred features.

BRIEF DESCRIPTION OF THE DRAWINGS

A preferred and non-limiting embodiment of the invention will now be described, by way of example, with reference to the accompanying drawings, in which:

FIGS. 2A-D are schematic vertical cross-sectional views of a deburring receptacle in the installation of FIG. 1 and illustrating the method for high-pressure liquid jet deburring according to the invention, where:

FIG. 2A illustrates an initial phase, in which the receptacle is filled with a cleaning liquid and a workpiece is being positioned with respect to high-pressure jet nozzles;

FIG. 2B illustrates a main working phase, during which the workpiece is being deburred by means of high-pressure/high-speed liquid jets while both the workpiece and the high-pressure jet nozzles are immersed in cleaning liquid;

FIG. 2C is an enlarged side view according to the dash-dotted region indicated in FIG. 2B and illustrating an operating high-pressure jet nozzle in more detail;

FIG. 2D illustrates a final phase, during which cleaning liquid is being drained and the deburred workpiece is being removed;

Identical reference signs are used for identifying identical or similar elements throughout these drawings.

DESCRIPTION OF A PREFERRED EMBODIMENT

Figure 1:
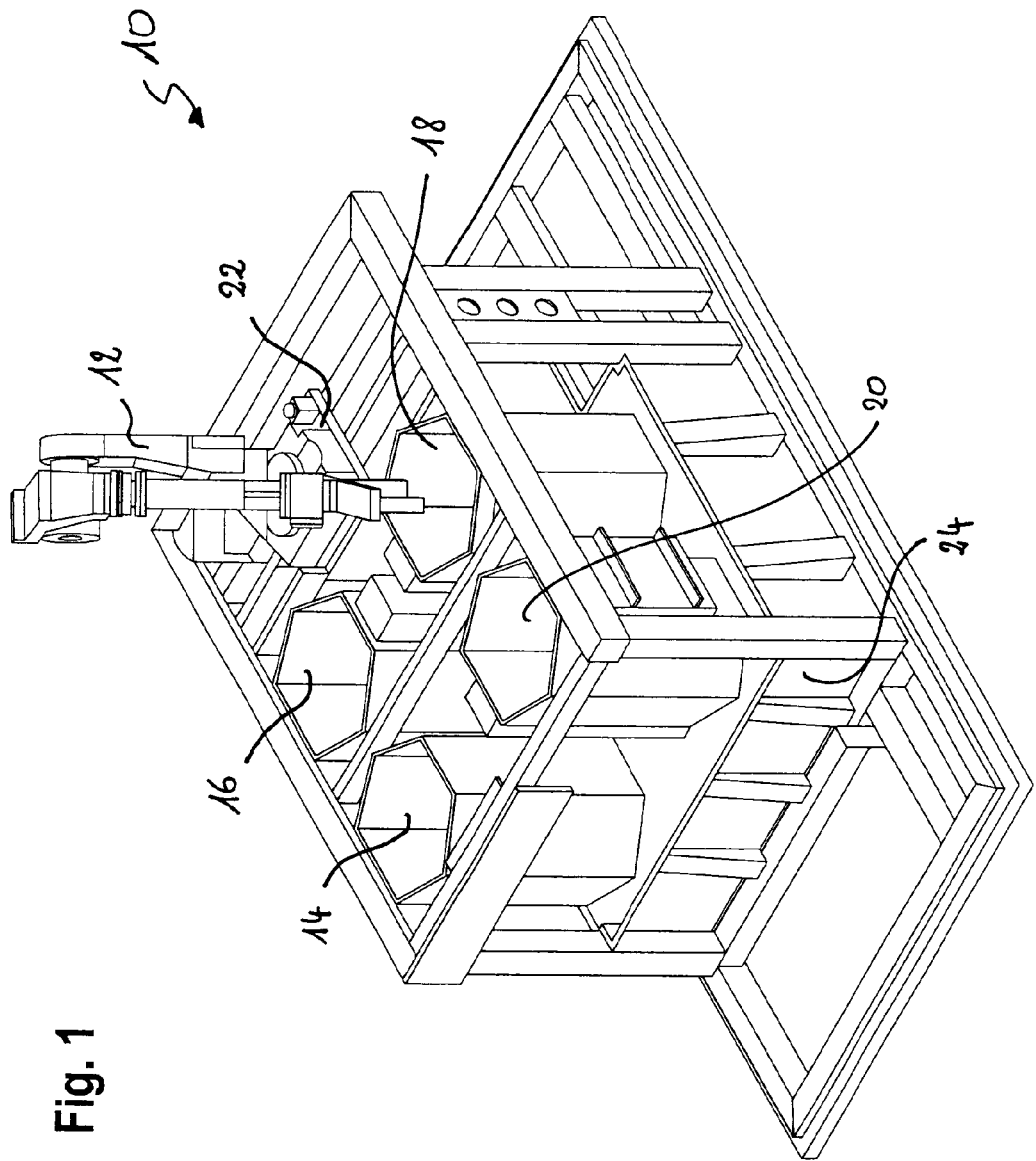
FIG. 1 is a schematic perspective view of an industrial installation for high-pressure liquid jet deburring according to the invention.

FIG. 1 generally illustrates an industrial cleaning installation 10 for high-pressure liquid jet deburring. The installation 10 comprises a positioning device, more specifically a six-degree-of-freedom robot 12, e.g. a standard type articulated industrial robot, for automatically positioning a workpiece and holding it by means of a suitably designed end-effector (also called gripper). The installation 10 further comprises a pre-washing receptacle 14, a first deburring receptacle 16, a second deburring receptacle 18 and a drying receptacle 20, which, in the given order, provide consecutive treatment stations for subjecting a machined workpiece, e.g. a cylinder head of an internal combustion engine (as shown in FIGS. 2A-D), to a complete deburring cycle. As will be understood, the receptacles 14, 16, 18, 20 are each arranged within the work envelope, i.e. the reachable workspace, of the robot 12 so that the robot 12 can position and hold a workpiece inside each of the receptacles 14, 16, 18, 20. Furthermore, as is apparent from the perspective view of FIG. 1, the robot 12 has a mounting base 22 arranged above the horizontal level of the uppermost opening of either of the receptacles 14, 16, 18, 20 (which are level in FIG. 1). As also seen in FIG. 1, the receptacles 14, 16, 18, 20 are arranged in closely adjacent manner and on a understructure 24, in which accessory equipment such as connection conduits for fluid, air, electric, pneumatic and/or hydraulic circuits as well as related components and fittings are protected so that the installation 12 itself forms a relatively compact unit of reduced footprint that can be easily integrated, e.g. into a fully automated production line.

The installation 10 of FIG. 1 is designed for performing, in sequence, the following basic steps of a complete deburring process:

the robot 12 grips a workpiece from a suitable automatic feeder (not shown);

the robot 12 moves the workpiece into the pre-washing receptacle 14;

the workpiece is subjected to a pre-washing operation inside the pre-washing receptacle 14;

the robot 12 moves the workpiece from the pre-washing receptacle 14 into the first deburring receptacle 16 and appropriately positions and holds the workpiece therein;

a certain machined portion of the workpiece is deburred by means of a high-pressure/high-speed liquid jet from one or more high-pressure jet nozzles that are mounted stationary inside the first deburring receptacle 16;

the robot 12 moves the workpiece from the first deburring receptacle 16 into the second deburring receptacle 18 for consecutively deburring further machined portions of the workpiece;

a further machined portion of the workpiece is deburred by means of a high-pressure/high-speed liquid jet from one or more high-pressure jet nozzles that are mounted stationary inside the second deburring receptacle 18;

the robot 12 moves the workpiece from the second deburring receptacle 18 into the drying receptacle 20;

the workpiece is subjected to a drying operation inside the drying receptacle 20 for removing any remaining liquid from the workpiece, e.g. by high-flow rate hot air blowing;

the robot 12 moves the workpiece out of the drying receptacle and releases the workpiece onto a suitable automatic feeder (not shown) for subsequent processing of the workpiece.

The pre-washing operation and the related pre-washing receptacle 14 as such are beneficial but not essential to the present invention and may be of any suitable form, e.g. of a suitable flood-washing type (so-called "whirlpool") well-known to the skilled person. Pre-washing has the benefit of removing any contamination such as loose burrs and cutting oil adhering to the workpiece, which might adversely affect subsequent liquid jet deburring. Similarly, the drying operation and the related drying receptacle 20 as such are beneficial but not essential to the present invention and may be of any suitable form, e.g. of a suitable high rate air-blowing type also well-known to the skilled person. Drying is beneficial to remove any residual cleaning liquid that might affect subsequent processing.

Turning to FIGS. 2A-D, which illustrate the first deburring receptacle 16 in vertical cross-section during different phases, main aspects of the proposed installation and method for high-pressure liquid jet deburring will be detailed below.

Figure 2A:
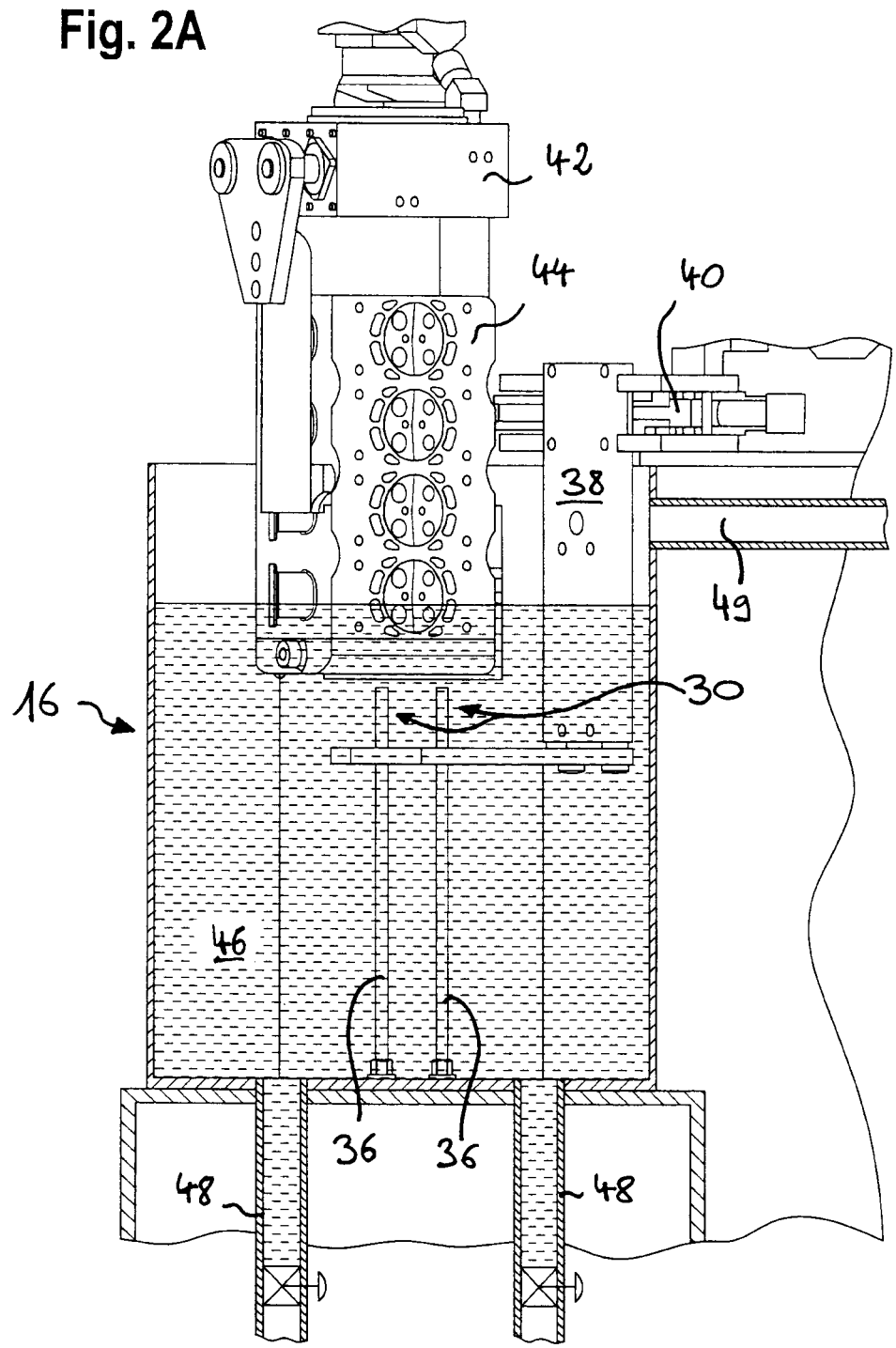
Figure 2C:
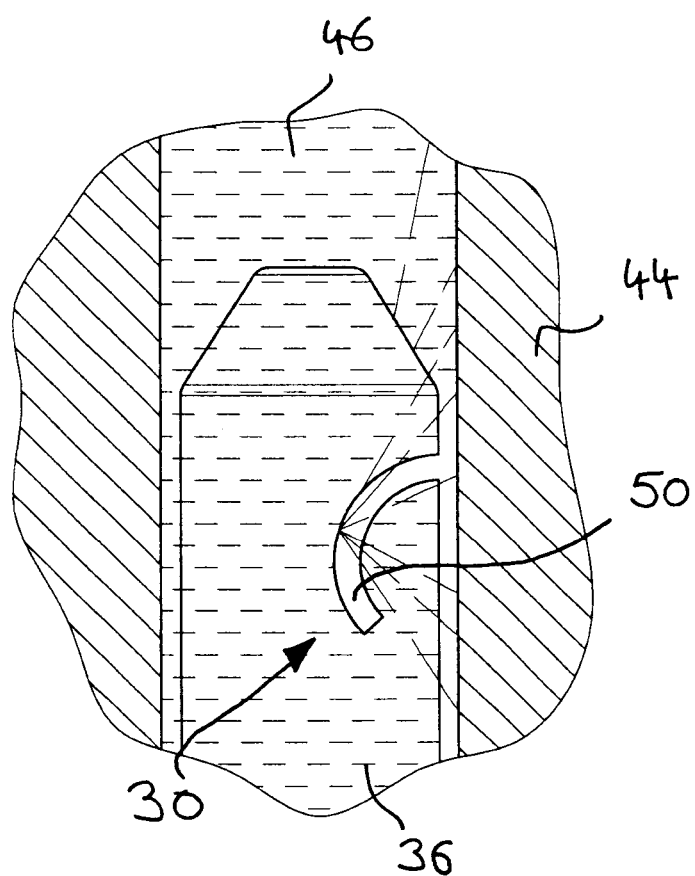
Figure 2D:
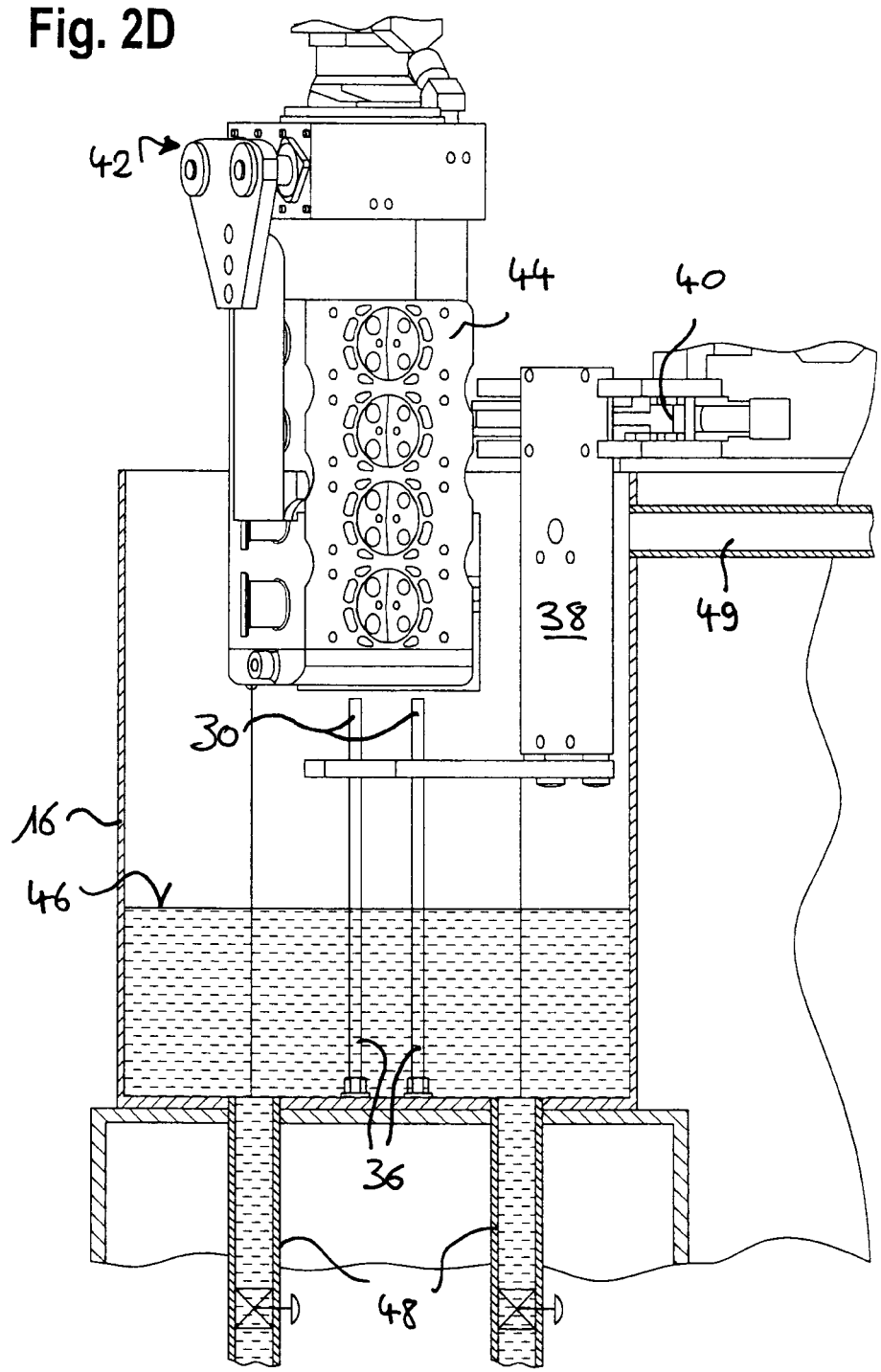

As seen in FIGS. 2A, 2B & 2D, a number (at least one up to a plurality, depending on the workpiece) of high-pressure jet nozzles 30, e.g. two lances as shown for illustration purposes, are mounted stationary inside the first deburring receptacle 16, e.g. fixed to the bottom plate of the receptacle 16. While not shown in detail in FIG. 3, the high-pressure jet nozzles 30 are connected to a high-pressure liquid circuit 32 that is configured as a pure water jet deburring circuit, preferably a recirculation circuit with a particle filter, and equipped with a high-pressure pressurization source, e.g. a high-power pump 34, with a nominal power of e.g. >500 kW or, more preferably, an energy-efficient high-pressure pump 34 with a nominal power of around 100 kW, i.e. <<500 kW. In the shown embodiment, the high-pressure jet nozzles 30 are integrally formed by the upper region (see dash-dotted circle in FIG. 2B) of elongated thin lances 36 having a diameter in the range of 4-10 mm. Each lance 36 is welded to the bottom plate of the receptacle 16, 18 and projects into the receptacle 16, 18 to locate its nozzle 30 at an appropriate position that depends on the workpiece geometry. While shown as extending vertically, the lances 36 with the nozzles 30 may have any orientation, e.g. in the second deburring receptacle 18 a number of horizontal lances 36 can be fixed to a lateral sidewall of the receptacle 18 and oriented horizontally.

As further seen in FIGS. 2A, 2B & 2D, the installation 10 comprises a removable clamp 38 arranged inside the receptacle 16. The clamp 38 is configured for bringing back to default position and for holding one or more of the stationary lances 36, especially in the region of the nozzles 30, into position when the respective lances 36 are not in use as shown in FIGS. 2A & 2D and for releasing the lances 36 prior to and during the time the nozzles 30 are deburring as seen in FIG. 2B. To this effect, the removable clamp 38 of FIGS. 2A-D has two holders that are vertically pivotable between an engaged and a disengaged position and that are actuated, e.g. by a pneumatic cylinder 40. As a further benefit, the clamp 38 allows avoiding deformation of the lances 36 in case of a collision with a workpiece and to enable collision-detection implemented in the control system of the robot 12.

As further best seen in FIGS. 2A, 2B & 2D, the robot 12 has an end-effector 42 (gripper) configured in known manner to manipulate a workpiece 44, e.g. a cylinder head as shown in FIGS. 2A-D. Accordingly, it will be appreciated that the workpiece 44 is properly positioned by the robot 12 relative to the stationary high-pressure jet nozzle(s) 30 and lance(s) 36 so that one or more machined portions that are to be deburred are automatically located within the range of action of the jet nozzle(s) 30. Accordingly, no expensive arrangement for moving the nozzles 30 themselves relative to the workpiece 44 is needed.

According to a main feature of the installation 12, the deburring receptacles 16, 18, as seen in FIGS. 2A-D, are both configured as leak-free containers/tanks capable of holding a (strongly agitated) bath 46 of liquid, e.g. cleaning liquid. Furthermore, the deburring receptacles 16, 18 have a respective flooding inlet 48 connected to a cleaning liquid supply circuit for flooding (rapidly filling) the deburring receptacle 16, 18 with a cleaning liquid. Although not illustrated, the flooding inlet(s) 48 may be connected by a suitably controlled motor-operated valve to a low pressure circuit or to any separate suitable source of cleaning liquid. In the phases shown in FIGS. 2A & B, the bath 46 has already reached its operating level, whereas FIG. 2D illustrates the phase of draining of the bath 46. As appears from FIGS. 2A, 2B & 2D, each deburring receptacle has an upper opening through which the workpiece 44 is inserted/removed by the robot 12. Preferably, each upper opening is of identical geometry and, although not illustrated, the robot 12 comprises a lid or cover that cooperates with the upper opening of each receptacle 14, 16, 18, 20 to close the latter so as to avoid splashing and mist/vapour emissions and to protect the robot 12.

Another key aspect of the proposed method resides in that the respective receptacle 16, 18 has been flooded with cleaning liquid prior to deburring via inlet 48, preferably before the workpiece is positioned (as seen in FIG. 2A) and, consequently, in that deburring (FIG. 2C) is performed while the high-pressure/high-speed liquid jet—as schematically shown by radiant dashed lines in FIG. 2C—itself as well as at least the dipped machined portion that is to be deburred are both immersed in the bath 46. This phase of deburring and simultaneous immersion of the relevant region(s) of the workpiece 44 and the nozzle(s) 30 is best seen by comparison of FIG. 2B & FIG. 2C.

Although not shown in the drawings, it will be appreciated that the installation 10 takes advantage of the bath 46 in order to perform additional flood-washing of the workpiece prior to, especially during, and also after immersed deburring properly speaking as illustrated in FIG. 2C. To this effect, the receptacles 16, 18 are preferably connected to a recirculation circuit, which is equipped with a particle filter and a high-pressure pump, via at least one inlet and outlet connection (not shown) configured for creating turbulence in the bath 46. Preferably, this flood-washing recirculation circuit coincides, i.e. forms part, of the high-pressure circuit 32 required for deburring, whereby power consumption and installation cost can be reduced and flood washing can be achieved taking advantage of the same pump 34, which is used for deburring.

As further illustrated in FIG. 2C, the nozzle 30 comprises an elongated nozzle aperture 50 of specific curved shape chosen in function of the workpiece 44 and created in the lance 36 e.g. by electro-erosion. In FIG. 2C, the nozzle aperture 50 is formed as a circular-arc shaped (in vertical side view) incision formed in the cylindrical tubular sidewall of the lance 36 so as to extend downwardly away from the tip of the lance 36. The shape of the nozzle aperture 50 is variable and determined in function of the workpiece geometry and machining. Preferably however, the transverse width of the nozzle aperture 50 is in the range of 0.025-0.2 mm. In combination with a suitable high-pressure source such as pump 34, the nozzle aperture 50 is configured to achieve a dynamic exit pressure at the nozzle outlet of preferably >100 bar, more preferably >500 bar to improve the deburring effect. Furthermore, the jet exit velocity at the nozzle aperture 50 is preferably at the speed of sound, e.g. sonic velocity in air or sonic velocity in water (i.e. >1 m/s) at 20° C.

FIG. 2C also illustrates the unsheathed nature of the high-pressure/high-speed liquid jet. In particular, the nozzle 30, which has a single outlet and single medium supply, produces a liquid jet that is devoid of any purposely created partial or complete gas sheathing. Contrary to accepted practice in underwater cleaning, it has been found that deburring is efficiently possible without reducing drag due to surrounding liquid. As further seen in FIG. 2C the nozzle 30, due to its shaped aperture 50 creates a jet with an aperture angle that largely exceeds 45° and possibly reaches 90°. The nozzle shape thus gives a large range of deburring. A suitable shape shown in FIG. 2C is for instance an elongated nozzle aperture 50 that is curved along the cylindrical shell of lance 36, i.e. about the lance axis, e.g. a vertical axis, and further about another perpendicular axis, e.g. a substantially horizontal axis. Other curved shapes, especially around two different axes, for creating a large aperture jet are not excluded however.

Figure 3:
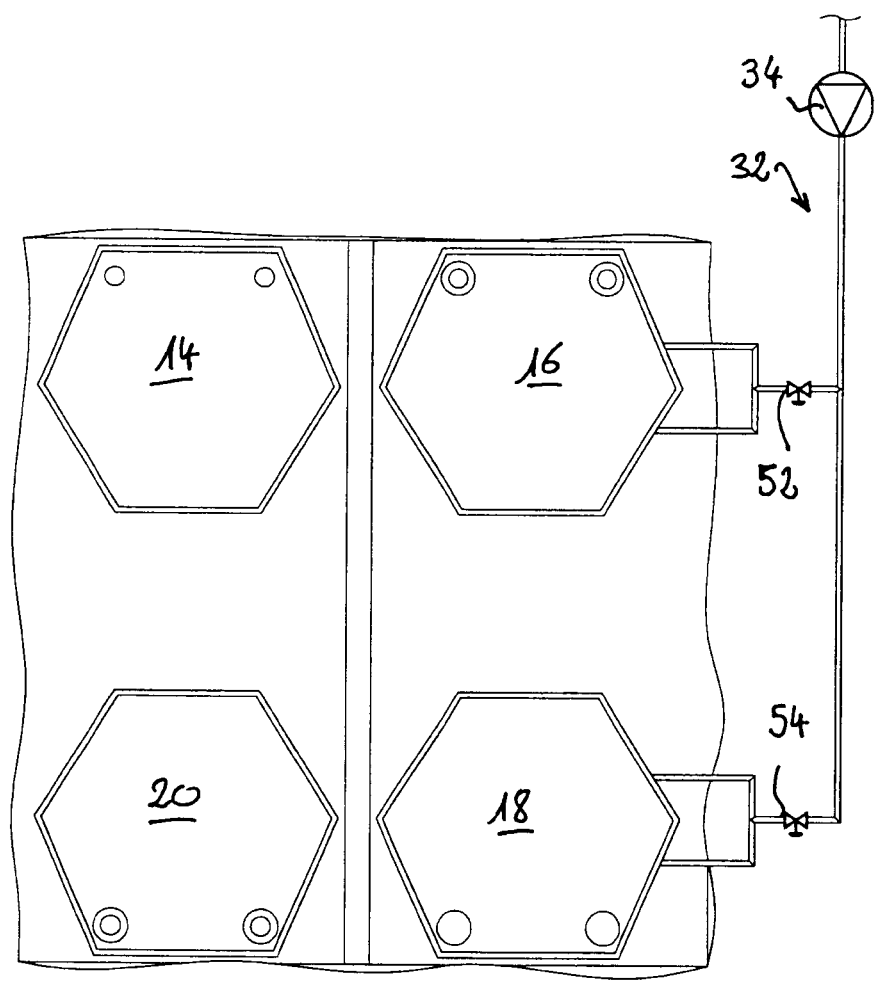
FIG. 3 is a schematic plan view of the installation of FIG. 1 illustrating the connection of two deburring receptacles to a high-pressure liquid circuit.

As schematically illustrated in FIG. 3, the circuit 32 is preferably equipped with a single pressurization source, such as pump 34. Accordingly, the circuit 32 is configured, by means of suitably arranged valves, e.g. controlled motor-operated valves 52, 54, to supply the nozzles 30 of the first and second deburring receptacles 16, 18 in succession with high-pressure liquid. Optionally, the circuit 32 may be configured to connect the pump 34 in sequence to flood washing inlets (and to corresponding outlets for return) of both deburring receptacles 16, 18. Preferably, although not shown, the circuit 32 is further configured to also connect the pump 34 initially to the pre-washing receptacle 14. Such serially operating configuration and connection permits achieving the various treatment steps in the receptacles 14, 16, 18 by means of the single continuously operating high-power pump 34 and thereby enables related power consumption and installation cost savings. As will be appreciated, the circuit 32 is designed for and carries pure liquid (a purely liquid phase), e.g. water, which is devoid of abrasive additives but may contain cleaning additives such as tensides, as preferred deburring and cleaning liquid.

LEGEND—LIST OF REFERENCE SIGNS 10 installation for high-pressure liquid jet deburring
12 industrial robot
14 pre-washing receptacle
16 first deburring receptacle
18 second deburring receptacle
20 drying receptacle
22 mounting base
24 understructure
30 high-pressure jet nozzle
32 high-pressure liquid circuit
34 high-pressure pump
36 lance
38 clamp
40 pneumatic cylinder
42 robot end-effector
44 workpiece (e.g. cylinder head)
46 bath
48 flooding inlet
49 overflow outlet
50 nozzle aperture
52, 54 controlled valves

The invention claimed is:

1. A method for high-pressure liquid jet deburring a workpiece of metal, the method comprising:
positioning the workpiece of metal inside a deburring receptacle by a positioning device, the workpiece of metal having at least one machined portion from which burr is to be removed;
deburring the machined portion by a high-pressure/high-speed liquid jet from a high-pressure jet nozzle while at least the machined portion is dipped in liquid;
flooding the deburring receptacle prior to deburring with cleaning liquid via a flooding inlet of the deburring receptacle; and
deburring the machined portion after flooding by a high-pressure/high-speed liquid jet without a gas sheath, such that the high-pressure/high-speed liquid jet and at least the machined portion are immersed in a bath of cleaning liquid during deburring.

2. The method according to claim 1, wherein the high-pressure jet nozzle creates a high-pressure/high-speed liquid jet with a jet aperture angle of at least 45°.

3. The method according to claim 2, wherein the jet aperture angle is in a range of 45° to 90°.

4. The method according to claim 1, wherein the high-pressure jet nozzle is mounted stationary inside the deburring receptacle, and wherein the positioning device positions the workpiece of metal relative to the stationary high-pressure jet nozzle, such that the machined portion is located within a range of action of the stationary high-pressure jet nozzle.

5. The method according to claim 1, further comprising:
creating turbulence in the bath of cleaning liquid by a pump for flood washing the machined workpiece of metal inside the deburring receptacle.

6. The method according to claim 1, wherein the positioning device is a 6-degree-of-freedom articulated industrial robot, and further comprising:
prior to deburring:
gripping the workpiece of metal by the robot;
moving the workpiece of metal into a pre-washing receptacle by the robot and pre-washing the workpiece;
moving the workpiece of metal into the deburring receptacle by the robot;
positioning the workpiece of metal inside the deburring receptacle by the robot, and
after deburring and optionally after moving the workpiece of metal into one or more further deburring receptacles by the robot for consecutively deburring one or more further machined portions of the workpiece of metal:
moving the workpiece of metal into a drying receptacle by the robot and drying the workpiece of metal in the drying receptacle; and
moving the workpiece of metal out of the drying receptacle by the robot for subsequent processing of the workpiece of metal.

7. The method according to claim 6, further comprising:
connecting a single pressurization source for providing high-pressure liquid in succession to the pre-washing receptacle, to the deburring receptacle and, if the workpiece of metal was moved into the one or more further deburring receptacles, consecutively to the one or more further deburring receptacles.

8. The method according to claim 6, wherein each of the receptacle(s) comprises an upper opening through which the robot inserts the workpiece of metal into the corresponding receptacle and wherein the robot has a mounting base arranged above the horizontal level of the uppermost opening of the receptacles.

9. The method according to claim 1, wherein the high-pressure jet nozzle is provided on or formed integrally with an elongated stationary lance projecting into the deburring receptacle, and further comprising:
holding the stationary lance in position by a removable clamp when the lance is not in use;
releasing the removable clamp after pre-positioning the workpiece of metal; and
positioning the workpiece of metal such that the machined portion is located within a range of action of the stationary high-pressure jet nozzle when the clamp is removed.

10. The method according to claim 1, wherein the nozzle creates an unsheathed high-pressure/high-speed liquid jet.

11. An apparatus for high-pressure liquid jet deburring a workpiece of metal, the apparatus comprising:
- a high-pressure jet nozzle connected to a high-pressure liquid circuit for deburring a machined portion of the workpiece of metal, from which burr is to be removed, by high-pressure/high-speed liquid jet;
- at least one deburring receptacle for containing a bath of cleaning liquid during operation and for receiving at least part of the workpiece of metal; and
- a positioning device for positioning the workpiece of metal relative to the high-pressure jet nozzle;
- wherein the deburring receptacle has a flooding inlet connected to a cleaning liquid supply circuit and suitable for flooding the deburring receptacle with a cleaning liquid; and
- the high-pressure jet nozzle is arranged in the receptacle and configured for creating an immersed high-pressure/high-speed liquid jet without a gas sheath.

12. The apparatus according to claim 11, wherein the high-pressure jet nozzle has a shaped outlet for creating a high-pressure/high-speed liquid jet with a jet aperture angle of at least 45°.

13. The apparatus according to claim 12, wherein the shaped outlet is an elongated outlet with double curvature.

14. The apparatus according to claim 12, wherein the jet aperture angle is in a range of 45° to 90°.

15. The apparatus according to claim 12, wherein the nozzle is mounted stationary inside the deburring receptacle.

16. The apparatus according to claim 11, wherein the positioning device is a 6-degree-of-freedom articulated industrial robot, and further comprising a pre-washing receptacle, the at least one deburring receptacle, optionally one or more further deburring receptacles and a drying receptacle, each of the receptacles being arranged within the reachable workspace of the robot.

17. The apparatus according to claim 16, further comprising a single pressurization source, optionally a high-pressure pump, for providing high-pressure liquid and a valve arrangement suitable for connecting the single high-pressure liquid supply circuit in succession to the pre-washing receptacle, to the deburring receptacle and, if the workpiece of metal was moved into the one or more further deburring receptacles, consecutively to the one or more further deburring receptacles.

18. The apparatus according to claim 16, wherein each of the receptacle(s) comprises an upper opening through which the robot can insert the workpiece of metal into the corresponding receptacle and wherein the robot has a mounting base arranged above the horizontal level of the uppermost opening of the receptacles.

19. The apparatus according to claim 11, further comprising an elongated stationary lance on which the high-pressure jet nozzle is provided or integrally formed, the lance projecting into the deburring receptacle; and
- a removable clamp for holding, and optionally repositioning, the stationary lance when the lance is not in use.

20. The apparatus according to claim 11, wherein the high-pressure jet nozzle is configured for creating an unsheathed high-pressure/high-speed liquid jet.

* * * * *